United States Patent [19]

Kimmal et al.

[11] Patent Number: 5,815,346
[45] Date of Patent: Sep. 29, 1998

[54] TEXTURED SLIDER SURFACE

[75] Inventors: Jay M. Kimmal, Fremont; Victor Dunn, San Jose, both of Calif.

[73] Assignee: Maxtor Corporation, Longmont, Colo.

[21] Appl. No.: 847,699

[22] Filed: Apr. 28, 1997

Related U.S. Application Data

[63] Continuation of Ser. No. 489,407, Jun. 12, 1995, abandoned.
[51] Int. Cl.$^6$ ...................................................... G11B 5/60
[52] U.S. Cl. ............................................................. 360/103
[58] Field of Search ............................................. 360/103

[56] References Cited

U.S. PATENT DOCUMENTS 4,646,180  2/1987  Ohtsubo .................................. 360/103
5,079,657  1/1992  Aronoff .................................. 360/103
5,309,303  5/1994  Hsia ....................................... 360/103

*Primary Examiner*—A. J. Heinz
*Attorney, Agent, or Firm*—Sheridan Ross P.C.

[57] ABSTRACT

A method of texturing the slider surface of a magnetic head, or the surface of a disk, with a laser. The laser is focused onto the hard disk drive component and a groove is ablated from the working surface. The steps of focusing and ablating can be repeated to create a pattern of grooves in the head and/or disk. The grooves are defined by a wall(s) that is perpendicular to a bottom surface of the groove.

10 Claims, 3 Drawing Sheets

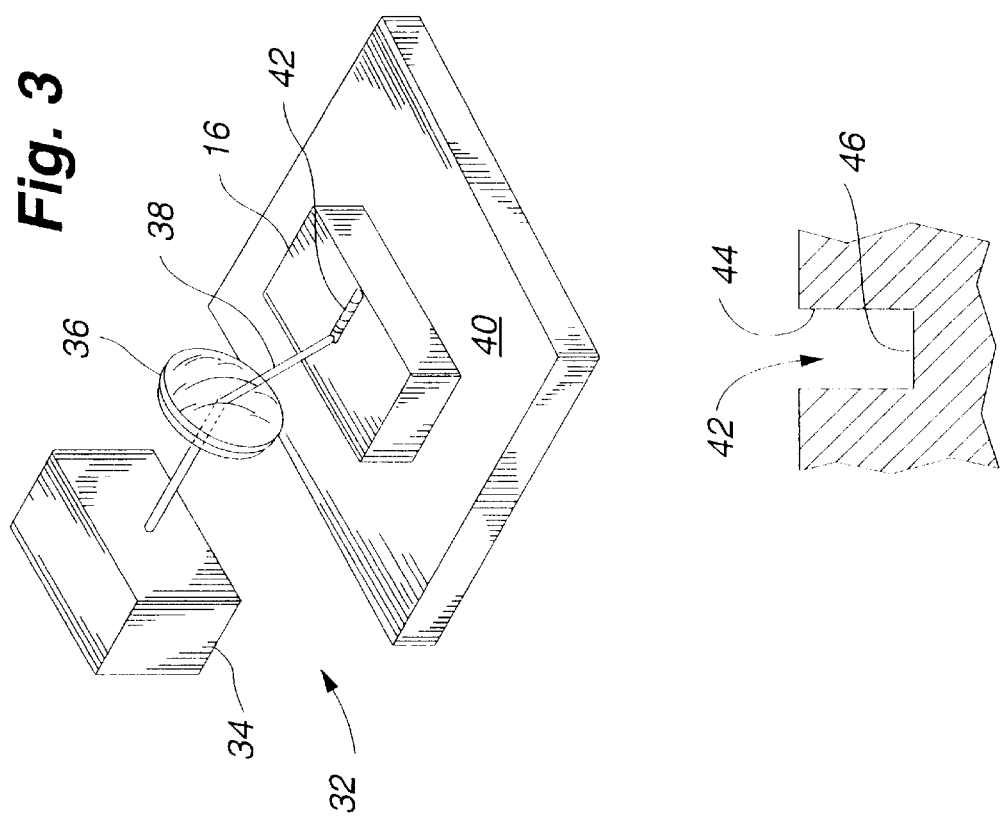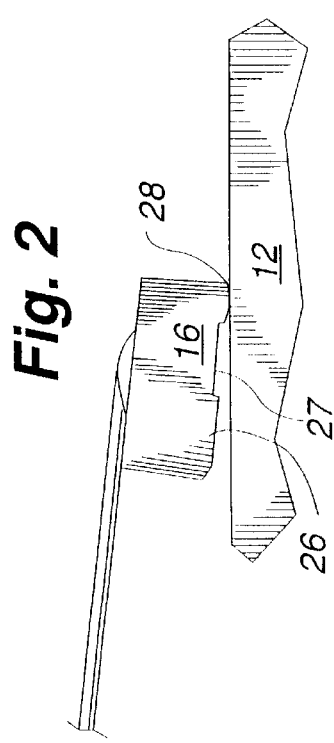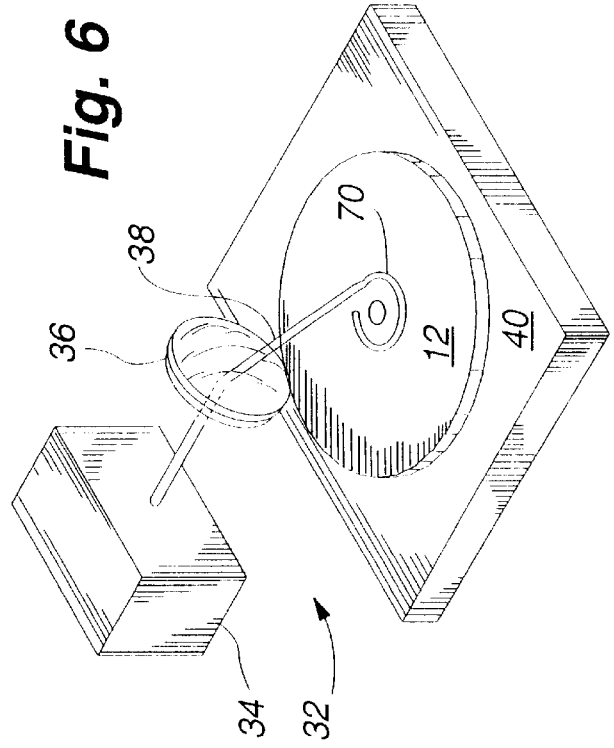

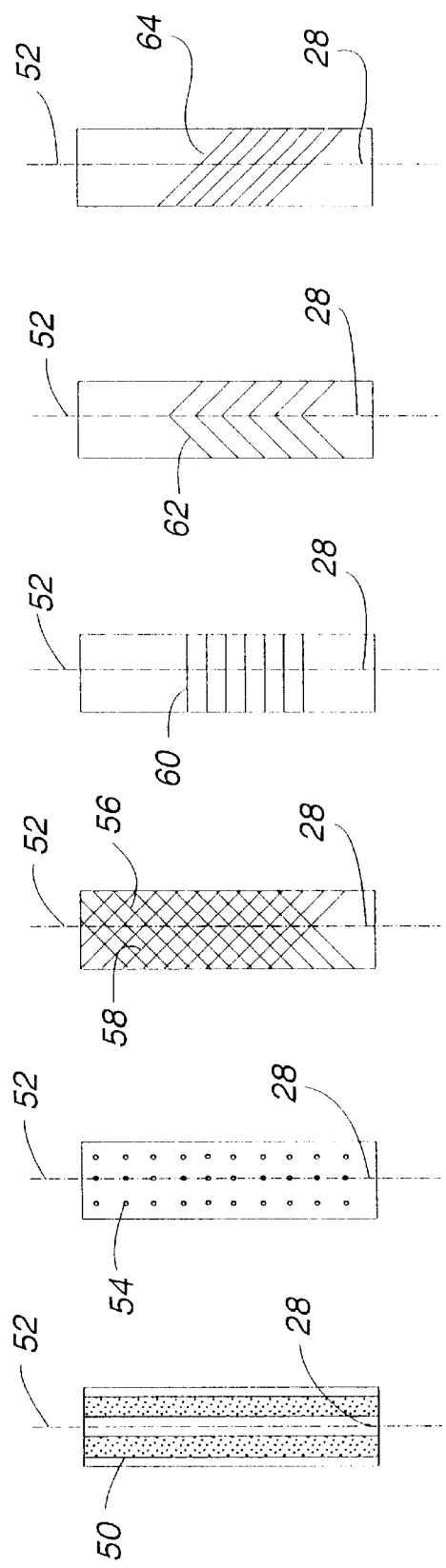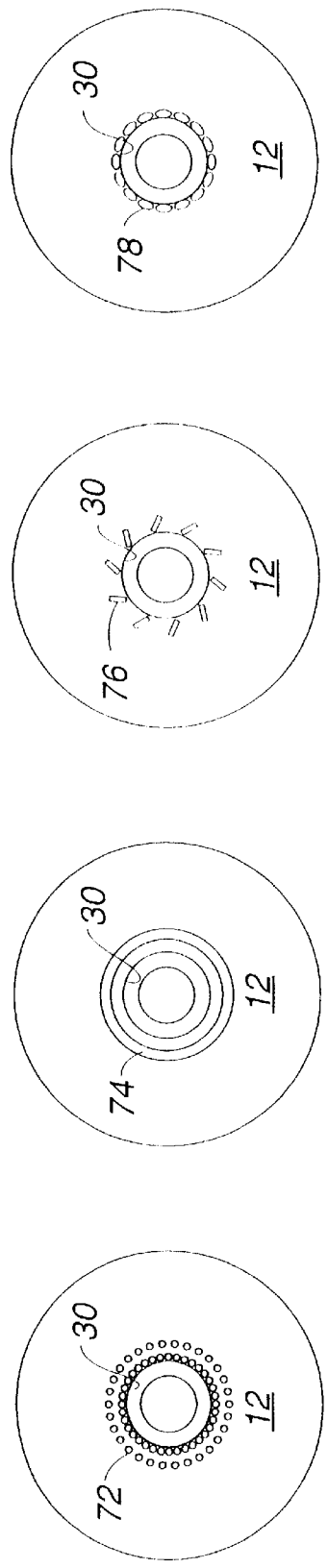

TEXTURED SLIDER SURFACE

This is a continuation of the application Ser. No. 08/489.407, filed on Jun. 12, 1995, and now abandoned.

BACKGROUND OF THE INVENTION

1. Field of the Invention

The present invention relates to a method of texturing the magnetic head and disk of a hard disk drive.

2. Description of Related Art

Hard disk drives contain a magnetic disk which rotates relative to a head(s). The head has a transducer which can magnetize and sense the magnetic field of the disk. Conventional magnetic heads have a slider surface which creates an air bearing between the head and the surface of the disk. The air bearing prevents wear on both the head and the disk.

The air bearing is eliminated when power to the hard disk drive is terminated and the disk spins down. Elimination of the air bearing allows the head to make contact with the surface of the disk. To avoid any potential loss of data, the head is moved away from the data section of the disk in the power down mode. Some disk drives move the head to an inner portion of the disk which does not contain data. The inner disk portion is sometimes referred to as a landing zone.

The head rest on the landing zone of the disk when the disk spins up. When the disk initially begins to spin, the frictional forces between the head and the surface of the disk may cause the head to stick to the disk, an event commonly referred to as stiction. Stiction may bend and damage the actuator arm on which the head is mounted and effect the performance of the drive. It is therefore desirable to have a head/disk interface which does not produce a large amount of stiction.

SUMMARY OF THE INVENTION

The present invention is a method of texturing the slider surface of a magnetic head, or the surface of a disk, with a laser. The laser is focused onto the hard disk drive component and a groove is ablated from the working surface. The steps of focusing and ablating can be repeated to create a pattern of grooves in the head and/or disk. The grooves are defined by a wall(s) that is perpendicular to a bottom surface of the groove. The grooves reduce the amount of contact surface area and corresponding stiction between the head and the disk.

It is therefore an object of the present invention to provide a method of texturing a surface of a head, or disk, of a hard disk drive, to reduce the stiction between the head/disk interface.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 2 is a side view showing a head flying above a disk;

FIG. 3 is a perspective view showing a laser system ablating grooves in a head;

FIG. 4 is a cross-sectional view of a groove formed in a head by the laser system;

FIGS. 5a–f are bottom views showing different groove patterns in the head;

FIG. 6 is a perspective view showing a laser system ablating grooves in a disk;

FIGS. 7a–d are top views showing different groove patterns in the disk.

DETAILED DESCRIPTION OF THE INVENTION

Figure 1:
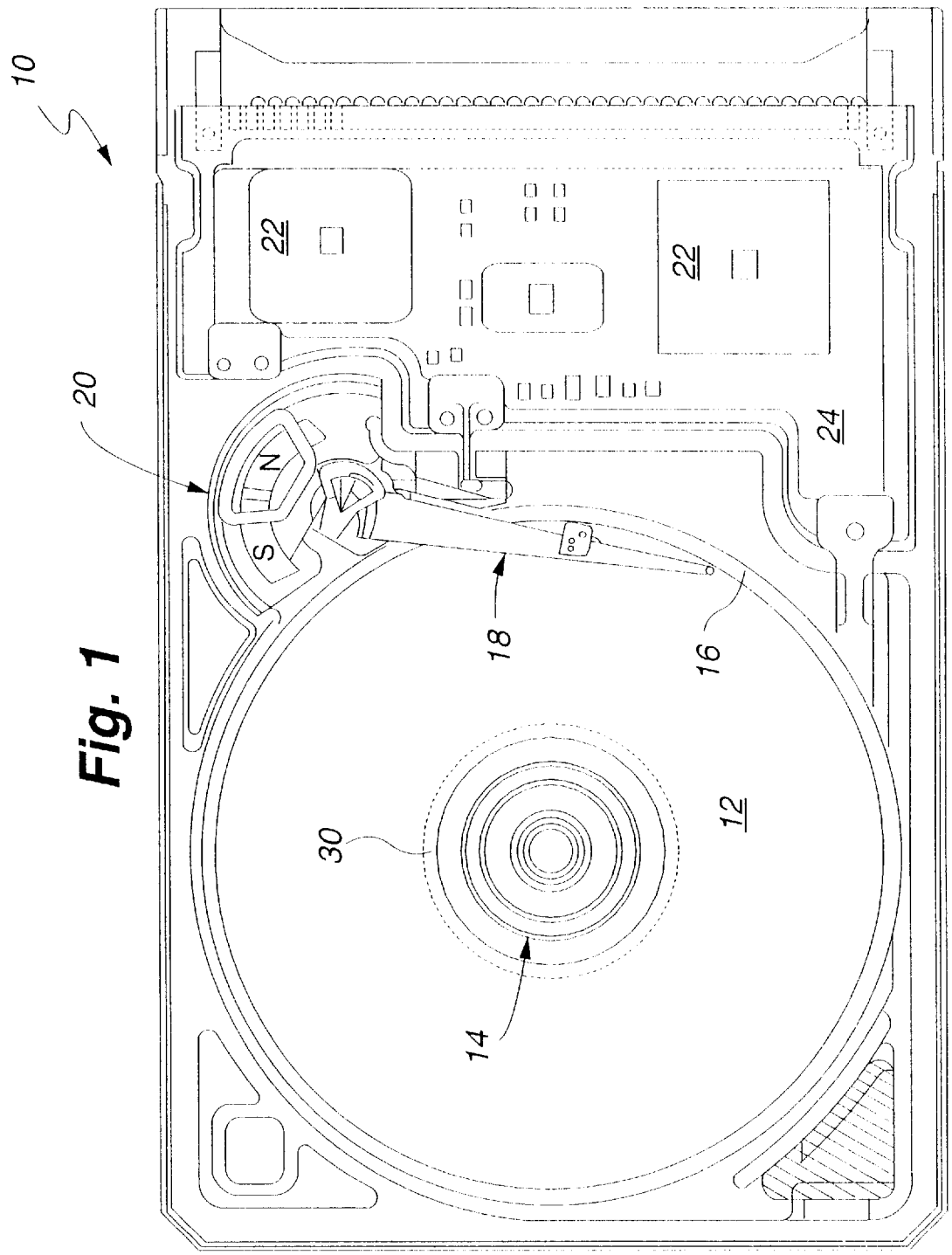
FIG. 1 is a top view of a hard disk drive.

Referring to the drawings more particularly by reference umbers, FIG. 1 shows a hard disk drive 10. The disk drive 10 includes a disk 12 that is rotated by a spin motor 14. The disk 12 spins relative to a head 16 that is mounted to an actuator arm 18. The actuator arm 18 has a voice coil motor 20 which can move the head 16 relative to the disk 12. The head 16 contains a transducer which can magnetize and sense the magnetic field of the disk 12. The spin motor 14, voice coil motor 20 and head 16 are controlled by electronics 22 mounted to a printed circuit board 24.

As shown in FIG. 2, rotation of the disk 12 produces an air current beneath the head 16. The head 16 has a slider surface 26 constructed to create a high pressure area which lifts the head 16 off of the surface of the disk 12. This high pressure area is commonly referred to as an air bearing 27. The air bearing 27 typically pivots the head 16 so that the transducer pole 28 is in close proximity to the surface of the disk 12. The slider 26 can be constructed so that the pole 28 is in continuous contact, intermittent contact or not in contact with the disk 12.

Referring to FIG. 1, when the disk 12 spins down, the voice coil motor 20 moves the head 16 to an inner portion of the disk 12. The inner portion does not contain any data and is commonly referred to as the landing zone 30. The head 16 and/or disk 12 of the present invention are textured to reduce the amount of friction between the two members when the disk 12 spins up and the head 16 is in contact with the disk surface.

FIG. 3 shows a method of texturing the head 16 with a laser system 32. The laser system 32 contains a laser generator 34 and a lens system 36 which focuses a laser beam 38 onto the head 16. The head 16 may be mounted to an x-y table 40 that can move the head 16 relative to the laser beam 38. The laser beam 38 is directed onto the head 16 to vaporize head material and ablate holes or grooves 42 in the slider surface 26.

FIG. 4 shows a cross-section of a typical hole 42 created by the laser system. The laser produced holes 42 are defined by walls 44 that are perpendicular to the bottom surface 46 of the hole 42. The perpendicular walls 44 are to be distinguished from a hole created by etching the head material, which would leave a relatively rounded bottom surface 46. After the laser system 32 has created the grooves 42 in the head 16, the slider surface 26 is polished to remove any rough edges around the holes 42. The laser ablation method provides a textured slider surface that does not have any significant asperities which can make contact with the disk 12 and increase the stiction of the head 16.

In the preferred embodiment, the laser generator 34 produces either a continuous or pulsed laser beam. It has been found that a head constructed from a composition of aluminum, titanium and carbon can be ablated with a YAG or EXCIMER laser generator 34 which creates a laser beam having a power of 500 Watts and a beam diameter of 0.001 inches. The pulse duration is set to create a relatively shallow groove 42 on the order of 50–5,000 Angstroms.

FIGS. 5a–f show different groove patterns that can be created in the slider surface 26 of the head 16. FIG. 5a shows a pair of grooves 50 that are essentially parallel with a longitudinal axis 52 of the head 16. FIG. 5b shows a groove pattern that includes a plurality of pit-like grooves 54 arranged along three rows which are parallel with the longitudinal axis 52 of the head 16. FIG. 5c shows a pattern of first grooves 56 that intersect a plurality of second grooves 58 that are both oriented at an angle relative to the longitudinal axis. Both sets of grooves 56 and 58 extend from one side of the slider surface 26 to the other opposite side of the slider surface 26.

FIG. 5d shows a slider surface 26 which has a plurality of grooves 60 perpendicular to the longitudinal axis 52. FIG. 5e shows grooves 62 that intersect in a triangular fashion. FIG. 5f shows a groove pattern 64 that contains a plurality of grooves that are oriented at angle relative to the longitudinal axis 52. The grooves are typically spaced away from the transducer pole 28. In the preferred embodiment, the grooves of FIGS. 5c–f have a width of approximately 0.001 inches. The patterns are typically formed by moving the head 16 relative to the laser beam 38 with the x-y table 40 shown in FIG. 3.

FIG. 6 shows the laser system 32 ablating grooves 70 in the surface of the disk 12. The grooves 70 are formed in the landing zone 30 of the disk 12. Although not shown, the disk drive 10 typically has a head for each disk surface. A dual head disk drive will therefore have two landing zones. After the groove pattern is formed in the landing zone of one disk surface, the disk is flipped over and the groove pattern is also formed in the landing zone of the opposite disk surface. It has been found that a disk overcoat constructed from carbon can be ablated with a YAG or EXCIMER laser generator 34 which creates a laser beam having a power of 250 Watts and a beam diameter of 0.001 inches. The pulse duration is set to create a relatively shallow groove on the order of 10–150 Angstroms.

FIGS. 7a–d show different groove patterns within the disk. FIG. 7a shows a plurality of circular grooves 72 arranged in an annular pattern around the landing zone 30.

FIG. 7b shows a plurality of annular grooves 74 concentrically located around the center of the disk. FIG. 7c shows an annular pattern of rectangular shaped grooves 76. FIG. 7d shows an annular pattern of oblong shaped grooves 78.

The disk drive 10 may have either a textured slider surface 26 or a textured disk surface 12, or have both a textured head 16 and a textured disk 12. The textured surfaces reduce the amount of friction and stiction between the two members and thus prolong the life of the drive 10.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A magnetic head apparatus for use in connection with a hard disk in a hard disk drive, comprising:

a magnetic head having a first length defined by a front edge and a rear edge and a width defined by opposite side edges thereof, said first length being aligned with a direction of travel of said magnetic head relative to said disk during operation;

a slider surface, disposed on a bottom of said head adjacent to one of said side edges, for slidably contacting said disk, said slider surface aligned with said first length of said head, said slider surface providing a lifting force to said head during operation, said slider surface having a slider surface length defined by a slider surface front edge and a slider surface rear edge measured along a slider surface longitudinal axis, said slider surface further having a slider surface width defined by opposing slider surface side edges; and a first plurality of grooves for providing a texture to said slider surface so as to reduce stiction, said first plurality of grooves extending from one slider surface side edge to the other slider sure side edge at an oblique angle to the slider surface longitudinal axis.

2. The magnetic head apparatus as recited in claim 1, including a second plurality of grooves that intersect said first plurality of grooves.

3. The magnetic head apparatus as recited in claim 2, wherein said second plurality of grooves extend from one slider surface side edge to the other slider surface side edge.

4. The magnetic head apparatus as recited in claim 3, wherein said second plurality of grooves extend from one slider surface side edge to the other slider surface side edge at an oblique angle to the slider surface longitudinal axis.

5. A magnetic head apparatus for use in connection with a hard disk in a hard disk drive, comprising:

a magnetic head having a first length defined by a front edge and a rear edge and a width defined by opposite side edges thereof, said first length being aligned with a direction of travel of said magnetic head relative to said disk during operation;

a slider surface, disposed on a bottom of said head adjacent to one of said side edges, for slidably contacting said disk, said slider surface aligned with said first length of said head, said slider surface providing a lifting force to said head during operation, said slider surface having a slider surface length defined by a slider surface front edge and a slider surface rear edge measured along a slider surface longitudinal axis, said slider surface further having a slider surface width defined by opposing slider surface side edges; and a first plurality of grooves for providing a texture to said slider surface so as to reduce stiction, each of said grooves in said first plurality of grooves having a pair of parallel walls extending from substantially one slider surface side edge to the other slider surface slider side edge and being disposed at a substantially constant angle relative to the slider surface longitudinal axis.

6. The magnetic head apparatus as recited in claim 5, wherein said constant angle relative to the slider surface longitudinal axis is 90 degrees.

7. The magnetic head apparatus as recited in claim 5, wherein at least one pair of parallel walls extend completely from one slider surface side edge to the other slider surface side edge.

8. A magnetic head apparatus for use in connection with a hard disk in a hard disk drive, comprising:

a magnetic head having a first length defined by a front edge and a rear edge and a width defined by opposite side edges thereof, said first length being aligned with a direction of travel of said magnetic head relative to said disk during operation;

a slider surface, disposed on a bottom of said head adjacent to one of said side edges, for slidably contacting said disk, said slider surface aligned with said first length of said head, said slider surface providing a lifting force to said head during operation, said slider surface having a slider surface length defined by a slider surface front edge and a slider surface rear edge measured along a slider surface longitudinal axis, said slider surface further having a slider surface width defined by opposing slider surface side edges; and a first plurality of grooves for providing a texture to said slider surface so as to reduce stiction, each of said grooves in said first plurality of grooves having a pair of parallel walls extending from substantially the slider surface front edge to the slider surface rear edge and being disposed at a substantially constant angle relative to the slider surface longitudinal axis.

9. The magnetic head apparatus as recited in claim 8, wherein said constant angle relative to the slider surface longitudinal axis is 0 degrees.

10. The magnetic head apparatus as recited in claim 8, wherein at least one pair of parallel walls extends completely from the slide surface front edge to the slider surface rear edge.

* * * * *

UNITED STATES PATENT AND TRADEMARK OFFICE
CERTIFICATE OF CORRECTION

PATENT NO.   : 5,815,346
DATED        : September 29, 1998
INVENTOR(S)  : Kimmal, et al.

It is certified that error appears in the above-identified patent and that said Letters Patent is hereby corrected as shown below:

On the cover page, INID Code No. 63, after "abandoned," please insert --which was a continuation of Ser. No. 164,172, Dec. 8, 1993, abandoned--

In column 1, line 4, after "abandoned," please insert --which was a continuation of Serial No. 08/164,172 filed on December 8, 1993, now abandoned--

In column 2, line 7, "umbers" should be deleted and --numbers-- substituted therefor.

In Claim 1, column 4, line 7, "sure" should be deleted and --surface--substituted therefor.

Signed and Sealed this

Sixteenth Day of March, 1999

Attest:

Q. TODD DICKINSON

*Attesting Officer*    *Acting Commissioner of Patents and Trademarks*